United States Patent
Muller et al.

(10) Patent No.: US 8,111,749 B2
(45) Date of Patent: Feb. 7, 2012

(54) IMAGE ENCODING OR DECODING METHOD AND DEVICE, WITH PARALLELIZATION OF PROCESSING OVER SEVERAL PROCESSORS AND COPROCESSORS, CORRESPONDING COMPUTER-READABLE STORAGE MEDIUM

(75) Inventors: Mathieu Muller, Thorigne-Fouillard (FR); Thomas Guionnet, Chantepie (FR); Sylvain Buriau, Vitre (FR); Mickaël Le Guerroue, Rennes (FR)

(73) Assignee: Envivio France, Chantepie (FR)

( * ) Notice: Subject to any disclaimer, the term of this patent is extended or adjusted under 35 U.S.C. 154(b) by 427 days.

(21) Appl. No.: 12/468,374

(22) Filed: May 19, 2009

(65) Prior Publication Data
US 2010/0067582 A1    Mar. 18, 2010

(30) Foreign Application Priority Data
May 19, 2008    (FR) .................................... 08 53225

(51) Int. Cl.
*H04N 11/04*    (2006.01)

(52) U.S. Cl. ............ 375/240.1; 375/240.24; 375/240.26

(58) Field of Classification Search ................. 375/240.1
See application file for complete search history.

(56) References Cited

U.S. PATENT DOCUMENTS
7,885,334 B2 * 2/2011 Muller et al. ............ 375/240.24

FOREIGN PATENT DOCUMENTS
| | | |
|---|---|---|
| EP | 1355499 A2 | 10/2003 |
| EP | 1624704 A2 | 2/2006 |
| FR | 2854754 A1 | 11/2004 |
| WO | 2008010979 A2 | 1/2008 |

OTHER PUBLICATIONS

French Search Report of Counterpart Application No. 08/53225, Filed on May 19, 2008.

* cited by examiner

*Primary Examiner* — Christopher S Kelley
*Assistant Examiner* — Jonathan Torchman
(74) *Attorney, Agent, or Firm* — Westman, Champlin & Kelly, P.A.

(57) ABSTRACT

A method is proposed for encoding/decoding an image having rectangular blocks of pixels. The image has a height of H blocks and a width of W blocks and is divided into vertical (or horizontal) bands of blocks having the height of H (or width of W) blocks. The method includes: obtaining N processors and M coprocessors, the M coprocessors distributed over S levels, $N>1$, $S>0$ and $M>S$; assigning the N processors $P_i$ to N contiguous bands $BP_i$ having sizes of $K_i$ blocks, $0 \leq i \leq N-1$ and $$\sum_{i=0}^{N-1} K_i = W;$$

for every level of coprocessors s, $0 \leq s \leq S-1$, assigning $M_s$ coprocessors $CP_{s,j}$ to $M_s$ contiguous bands having sizes of $Q_{s,j}$ blocks, with:

$$\sum_{j=0}^{M_s-1} Q_{s,j} = W;$$

managing sending of first, second and third start messages, and first and second verification messages to the processors and coprocessors, according to a predetermined set of rules.

10 Claims, 4 Drawing Sheets

IMAGE ENCODING OR DECODING METHOD AND DEVICE, WITH PARALLELIZATION OF PROCESSING OVER SEVERAL PROCESSORS AND COPROCESSORS, CORRESPONDING COMPUTER-READABLE STORAGE MEDIUM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of encoding/decoding digital images. It applies in particular, but not exclusively, to the field of so-called real-time video encoders/decoders (co-decs).

A digital image typically includes rectangular blocks of pixels (also called macro-blocks), these blocks being distributed in lines and columns. Each rectangular block has a width of w pixels and a height of h pixels. In the H.264/AVC standard (ITU-T H.264, ISO/IEC 14496-10), for example, the images are cut up either into blocks of 16×16 pixels, or into blocks of 16×32 (MBAFF mode).

Throughout this entire description, the image being encoded or decoded can itself be a portion of a larger image.

Conventionally, the encoding or decoding of an image consists in processing all of the blocks thereof, sequentially, line-by-line, from left to right along a single line, and from top to bottom from one line to the other.

The disclosure applies, in particular, but not exclusively, to the encoding or decoding of a video sequence formed of successive images. In this case, the encoding or decoding technique is implemented in a video compression or decompression algorithm. It is then compliant with a compression/decompression standard such as (this list is not exhaustive):
  the H.263 standard, defined in the standardization document "ITU-T H.263";
  the H.263+ standard, defined in the standardization document "ITU-T H.263+";
  the H.264 standard (also called H.26L or MPEG-4 AVC): defined in the standardization document "ISO MPEG-4 Part 10";
  the MPEG-4 Video standard: defined in the standardization document "ISO MPEG-4 Part 2".

It is clear, however, that the disclosure likewise applies to the encoding or decoding of a still image.

Generally speaking, the disclosure can be applied in every case where there is a spatial dependency context for processing the blocks of an image. In other words, it is assumed that, in order to process each block of the image, the result of previous processing of other blocks of the same image must be known.

Such a spatial dependency context exists, in particular, but not exclusively, in the encoding or decoding methods compliant with the aforesaid compression/decompression standards and based on motion estimation.

To illustrate, FIG. 1 describes the spatial dependencies which exist between the blocks of an image, within the scope of the H.264/AVC standard. In order to process a given block B, the result of the processing of the blocks of the causal spatial vicinity $B_A$ (left-hand block), $B_B$ (top block), $B_C$ (top right-hand block) and $B_D$ (top left-hand block) must be known.

BACKGROUND OF THE DISCLOSURE

Described below are the problems which exist in the case of encoding/decoding a video sequence formed of successive images, and with which the inventors of the present patent application were confronted. The disclosure is, of course, not limited to this particular case of application, but is of interest for any image encoding/decoding technique having to confront close or similar problems.

Designing a video encoder which is both real time and of high quality is a true technological challenge, in particular in the case of high-resolution videos (e.g., SD ("Standard Definition"), HD ("High Definition")). As a matter of fact, video encoding is a particularly complex application.

It appears that processing all of the blocks of an image via a single processor is not optimal in terms of computing time. In order to bring together the necessary computing power, use is therefore often made of parallelization: several processing units operating simultaneously on various portions of the video. The computing time can theoretically be divided by the number of processing units implemented.

A first known technique for parallelizing a video encoder consists in limiting the spatial and temporal dependencies. Thus, the H.264/AVC standard (ITU-T H.264, ISO/IEC 14496-10) enables the images to be cut up into separate slices. The slices of a single image can be encoded in parallel, each slice being processed by a separate processing unit (processor). It then suffices to concatenate the bit streams resulting from the processing of the various slices.

This first known technique has the major disadvantage of limiting the encoder performance in terms of compression/quality (loss of compression efficiency). As a matter of fact, besides the weighting of the syntax elements relative to the slices, cutting into slices prohibits the use of inter-slice spatial correlation. Such being the case, the purpose of the spatial and temporal dependencies is to best utilize the correlations present in the video source. This is what makes it possible to maximize the compression efficiency of the video encoder. As a matter of fact, recent video compression formats (H.264/AVC, MPEG4 ASP, H.263) introduce strong spatial and temporal dependencies in video processing. The images are generally cut up into 16×16 pixel size blocks (macro-blocks). Successive processing of these blocks is sequential by nature, insofar as the processing of each block requires knowledge of the result of the processing of the neighboring blocks. In the same way, the images can conventionally be temporally encoded according to 3 different modes, I, P or B. The encoding of an image B requires knowledge of at least two previously encoded images P. The encoding of an image P requires knowledge of at least one previously encoded image P.

A second known technique for parallelizing a video encoder is described in the patent application published under the number WO 2004/100557, and filed by Envivio. This involves a spatial parallelization method for processing blocks on N processors, making it possible to preserve the dependencies required by video compression standards. The general principle consists in cutting the image up into bands which are perpendicular to the sequential block processing direction. This makes it possible to obtain an optimal distribution of the loads between processors. For example, if the processing of the macro-blocks is carried out sequentially, line-by-line, the image is separated into vertical bands. In addition, synchronization of the processing carried out by the N processors makes it possible to prevent one processor from attempting to process a given block while other blocks on which this block depends have not yet been processed.

This second known technique is effective, but can turn out to be insufficient, for several reasons:

- the number N of processors is limited. As a matter of fact, it is not possible to use more than W processors, with W being the number of blocks per line of the image (i.e., the width of the image in blocks) in the case of line-by-line processing, with the image being cut up into vertical bands. Furthermore, the larger the number of processors used, the less efficient the parallelism, due to the initialization and termination phases during which the processors are not all used;
- designing a machine with many processors is complicated and costly;
- even with multiprocessor platforms comprising many processors, the total computing power is limited and can turn out to be insufficient. It is necessary to have more power in order to improve the compression performance of real-time video encoders.

It is conventional practice to make use of coprocessors in order to increase the processing capacity of the processors. In general, each processor is assigned one coprocessor. Processors and coprocessors are generally differentiated not by the technical nature thereof (CPU, FPGA, ASIC, DSP, . . . ), but by the role of same within the system. The processor has a master processing unit role; it is responsible for the overall control of the application, as well as for a certain number of decision-making and computing tasks. The coprocessor has a slave processing unit role; it is used by the processor for the more complex computations. It should be noted that, in a processor/coprocessor configuration such as this, the communication of data between processor and coprocessor can take a considerable amount of time, which has an adverse affect on the overall performance of the device.

In actual practice, the so-called "generic" processors often enable all sorts of computations to be made, have rapid memory access and are efficient in the case of "jumps" ("if" instructions, loops). On the other hand, they are not necessarily the most powerful. Coprocessors, e.g., DSP or FPGA, are better suited to supercomputing. However, they are more hampered by jumps and do not have the same storage capacities.

However, within the context of the aforesaid second known technique, for parallelizing a video encoder, the combined use of processors and coprocessors is not easy or problem-free.

As a matter of fact, the basic solution consisting of assigning one coprocessor to each processor (and of therefore using a number N of processors equal to the number M of coprocessors) is not optimal. As a matter of fact, in order for such a solution to be effective, it would be necessary to ensure that the coprocessors are correctly dimensioned with regard to the required processing, which is unfortunately difficult, or even impossible in actual practice. If the coprocessors have an insufficient amount of power, the system will obviously not be capable of operating. If, on the other hand, the coprocessors are too powerful, they will be under-exploited and the additional cost related to the implementation of these more powerful coprocessors will be unnecessary.

Therefore, it would be appropriate to adopt a more complex solution, wherein the number N of processors would be different from the number M of coprocessors (i.e.: N≠M, with N>0 and M>0). For example, by seeking to develop products based on generic processors and FPGA type coprocessors, the inventors of the present application were confronted with a significant gap between the processing capacities of the processors and coprocessors. Furthermore, it is costly and complex to implement a coprocessor for each processor. In this regard, it would be more advantageous to use a single very powerful coprocessor for several processors. For example, a single FPGA coprocessor for four processors.

However, nothing in the prior art indicates how to manage the parallelization and synchronization of processing operations in such a context.

SUMMARY

In this description, a processor is understood to mean any type of master processing unit, and a coprocessor is understood to mean any type of slave processing unit.

In a first embodiment, a method is proposed for encoding or decoding an image comprising rectangular blocks of pixels, the image having a height of H blocks and a width of W blocks, the image being cut up into vertical bands of blocks having said height of H blocks, said method comprising the following steps:

obtaining of N processors and M coprocessors, said M coprocessors being distributed over S levels, with N>1, S>0 and M>S;

assigning of said N processors $P_i$ to N contiguous bands $BP_i$ having sizes of $K_i$ blocks, with $0 \leq i \leq N-1$ and $$\sum_{i=0}^{N-1} K_i = W;$$

for every level of coprocessors s, with $0 \leq s \leq S-1$, assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = W;$$

managing message sending to the processors and coprocessors according to the following rules, $BP_{i,r}$ being a line of row r of band $BP_i$, and $BCP_{s,j,r}$ being a line of row r of band $BCP_{s,j}$, with $0 \leq r \leq H-1$:

- when a processor $P_i$, with $i \geq 0$ and $i < N-1$, has finished processing a line $BP_{i,r}$, sending a first start message authorizing the processor $P_{i+1}$ to process line $BP_{i+1,r}$;
- when a coprocessor $CP_{s,j}$, with $j \geq 0$ and $j < M_s-1$, has finished processing a line $BCP_{s,j,r}$, sending a second start message authorizing the coprocessor $CP_{s,j+1}$ to process line $BCP_{s,j+1,r}$;
- when a processor $P_i$, with $i \geq 0$ and $i < N-1$, must process the last block of line $BP_{i,r}$, with r>0, sending a first verification message to the processor $P_{i+1}$ so as to verify if the first block of line $BP_{i+1,r-1}$ has already been processed;
- when a coprocessor $CP_{s,j}$, with $j \geq 0$ and $j < M_s-1$, must process the last block of line $BCP_{s,j,r}$, with r>0, sending a second verification message to the coprocessor $CP_{s,j+1}$ so as to verify if the first block of line $BCP_{s,j+1,r-1}$ has already been processed;

when the first block of line $BCP_{s,j,r}$ belongs to line $BP_{i,r}$ and the last block of line $BCP_{s,j,r}$ belongs to line $BP_{i+k,r}$:
  if k is greater than 0, or
  if k is equal to 0 and the last block of line $BCP_{s,j,r}$ is the last block of line $BP_{i,r}$,
    then when the coprocessor $CP_{s,j}$ has finished processing line $BCP_{s,j,r}$, sending a third start message authorizing the $P_i$ to process line $BP_{i,r}$.

In this first embodiment, processing of the blocks is carried out sequentially, line-by-line (conventional case of a sequential processing direction which is horizontal, along a line). The image is cut up into vertical bands.

The general principle of this first embodiment therefore consists in simultaneously parallelizing an encoder (e.g., a video encoder) over a set of processors and coprocessors. The spatial and temporal dependencies induced by the compression method are observed owing to specific synchronization mechanisms. Communications between processors and coprocessors are limited (use of only three types of start messages and two types of verification messages), so as to avoid any loss of time due to communication latencies.

The proposed technique is advantageous since it can be implemented even if the number of processors is different from the number of coprocessors (N≠M). However, it can likewise be implemented when the number of processors is equal to the number of coprocessors (N=M).

In other words, the proposed technique enables optimal exploitation of a multi-(processor/coprocessor) architecture in connection with image compression (e.g., video compression). In particular, it makes it possible to parallelize a video encoder over several processors and coprocessors which have different processing capacities. In this way, it is possible to have fewer coprocessors than processors and vice versa. The proposed parallelization preserves the dependencies between blocks which are introduced by the video compression method, while the compression performance levels therefore remain optimal.

In a second embodiment, a method is proposed for encoding or decoding an image comprising rectangular blocks of pixels, the image having a height of H blocks and a width of W blocks, the image being cut up into horizontal bands of blocks having said width of W blocks, said method comprising the following steps:
  obtaining of N processors and M coprocessors, said M coprocessors being distributed over S levels, with N>1, S>0 and M>S;
  assigning of said N processors $P_i$ to N contiguous bands $BP_i$ having sizes of $K_i$ blocks, with $0 \leq i \leq N-1$ and $$\sum_{j=0}^{M_s-1} Q_{s,j} = H;$$

for every level of coprocessors s, with $0 \leq s \leq S-1$, assigning of $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = H;$$

managing of message sending to the processors and coprocessors according to the following rules, $BP_{i,r}$ being a column of row r of band $BP_i$, and $BCP_{s,j,r}$ being a column of row r of band $BCP_{s,j}$, with $0 \leq r \leq W-1$:

when a processor $P_i$, with $i \geq 0$ and $i < N-1$, has finished processing a column $BP_{i,r}$, sending a first start message authorizing the processor $P_{i+1}$ to process column $BP_{i+1,r}$;

when a coprocessor $CP_{s,j}$, with $j \geq 0$ and $j < M_s-1$, has finished processing a column $BCP_{s,j,r}$, sending a second start message authorizing the $CP_{s,j+1}$ to process column $BCP_{s,j+1,r}$;

when a processor $P_i$, with $i \geq 0$ and $i < N-1$, must process the last block of column $BP_{i,r}$, with r>0, sending a first verification message to the processor $P_{i+1}$ so as to verify if the first block of column $BP_{i+1,r-1}$ has already been processed;

when a coprocessor $CP_{s,j}$, with $j \geq 0$ and $j < M_s-1$, must process the last block of column $BCP_{s,j,r}$, with r>0, sending a second verification message to the coprocessor $CP_{s,j+1}$ so as to verify if the first block of column $BCP_{s,j+1,r-1}$ has already been processed;

when the first block of column $BCP_{s,j,r}$ belongs to column $BP_{i,r}$ and the last block of column $BCP_{s,j,r}$ belongs to column $BP_{i+k,r}$:
  if k is greater than 0, or
  if k is equal to 0 and the last block of column $BCP_{s,j,r}$ is the last block of column $BP_{i,r}$,
    then when the coprocessor $CP_{s,j}$ has finished processing column $BCP_{s,j,r}$, sending a third start message authorizing the $P_i$ to process column $BP_{i,r}$.

In this second embodiment, processing of the blocks is carried out sequentially, column-by-column (unconventional case today but possible in the future with a sequential processing direction which is vertical, along a column). The image is cut up into horizontal bands.

The general principle and advantages of this second embodiment are the same as those of the above first embodiment.

The encoding and decoding is advantageously compliant with the standard belonging to the group comprising: H.263, H.263+, H264 and MPEG-4 Video.

This list is not exhaustive.

In another embodiment, the disclosure relates to a computer-readable storage medium storing a computer program comprising a set of instructions executable by a computer in order to implement foresaid method according to the first or second embodiment.

In another embodiment, a device is proposed for encoding or decoding an image comprising rectangular blocks of pixels, the image having a height of H blocks and a width of W blocks, the image being cut up into vertical bands of blocks, said device comprising:
  N processors and M coprocessors, said M coprocessors being distributed over S levels, with N>1, S>0 and M>S;
  means for assigning said N processors $P_i$ to N contiguous bands $BP_i$ having sizes of $K_i$ blocks, with $0 \leq i \leq N-1$ and $$\sum_{i=0}^{N-1} K_i = W;$$

for every level of coprocessors s, with $0 \leq s \leq S-1$, means for assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = W;$$

means for managing message sending to the processors and coprocessors according to the following rules, $BP_{i,r}$ being a line of row r of band $BP_i$, and $BCP_{s,j,r}$ being a line of row r of band $BCP_{s,j}$, with $0 \leq r \leq H-1$:

when a processor $P_i$, with $i \geq 0$ and $i < N-1$, has finished processing a line $BP_{i,r}$, sending a first start message authorizing the processor $P_{i+1}$ to process line $BP_{i+1,r}$;

when a coprocessor $CP_{s,j}$, with $j \leq 0$ and $j < M_s-1$, has finished processing a line $BCP_{s,j,r}$, sending a second start message authorizing the coprocessor $CP_{s,j+1}$ to process line $BCP_{s,j+1,r}$;

when a processor $P_i$, with $i \geq 0$ and $i < N-1$, must process the last block of line $BP_{i,r}$, with $r > 0$, sending a first verification message to the processor $P_{i+1}$ so as to verify if the first block of line $BP_{i+1,r-1}$ has already been processed;

when a coprocessor $CP_{s,j}$, with $j \geq 0$ and $j < M_s-1$, must process the last block of line $BCP_{s,j,r}$, with $r > 0$, sending a second verification message to the coprocessor $CP_{s,j+1}$ so as to verify if the first block of line $BCP_{s,j+1,r-1}$ has already been processed;

when the first block of line $BCP_{s,j,r}$ belongs to line $BP_{i,r}$ and the last block of line $BCP_{s,j,r}$ belongs to line $BP_{i+k,r}$:
if k is greater than 0, or
if k is equal to 0 and the last block of line $BCP_{s,j,r}$ is the last block of line $BP_{i,r}$,
then when the coprocessor $CP_{s,j}$ has finished processing line $BCP_{s,j,r}$, sending a third start message authorizing the $P_i$ to process line $BP_{i,r}$.

In another embodiment, a device is proposed for encoding or decoding an image comprising rectangular blocks of pixels, the image having a height of H blocks and a width of W blocks, the image being cut up into horizontal bands of blocks having said width of W blocks, said device comprising:

N processors and M coprocessors, said M coprocessors being distributed over S levels, with N>1, S>0 and M>S;

means for assigning said N processors $P_i$ to N contiguous bands $BP_i$ having sizes of $K_i$ blocks, with $0 \geq i \leq N-1$ and $$\sum_{j=0}^{M_s-1} Q_{s,j} = H;$$

for every level of coprocessors s, with $0 \leq s \leq S-1$, means for assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = H;$$

means for managing message sending to the processors and coprocessors according to the following rules, $BP_{i,r}$ being a column of row r of band $BP_i$, and $BCP_{s,j,r}$ being a column of row r of band $BCP_{s,j}$, with $0 \leq r \leq W-1$:

when a processor $P_i$, with $i \geq 0$ and $i < N-1$, has finished processing a column $BP_{i,r}$, sending a first start message authorizing the processor $P_{i+1}$ to process column $BP_{i+1,r}$;

when a coprocessor $CP_{s,j}$, with $j \leq 0$ and $j < M_s-1$, has finished processing a column $BCP_{s,j,r}$, sending a second start message authorizing the coprocessor $CP_{s,j+1}$ to process column $BCP_{s,j+1,r}$;

when a processor $P_i$, with $i \geq 0$ and $i < N-1$, must process the last block of column $BP_{i,r}$, with $r > 0$, sending a first verification message to the processor $P_{i+1}$ so as to verify if the first block of column $BP_{i+1,r-1}$ has already been processed;

when a coprocessor $CP_{s,j}$, with $j \geq 0$ and $j < M_s-1$, must process the last block of column $BCP_{s,j,r}$, with $r > 0$, sending a second verification message to the coprocessor $CP_{s,j+1}$ so as to verify if the first block of column $BCP_{s,j+1,r-1}$ has already been processed;

when the first block of column $BCP_{s,j,r}$ belongs to column $BP_{i,r}$ and the last block of column $BCP_{s,j,r}$ belongs to column $BP_{i+k,r}$:
if k is greater than 0, or
if k is equal to 0 and the last block of column $BCP_{s,j,r}$ is the last block of column $BP_{i,r}$,
then when the coprocessor $CP_{s,j}$ has finished processing column $BCP_{s,j,r}$, sending a third start message authorizing the $P_i$ to process column $BP_{i,r}$.

BRIEF DESCRIPTION OF THE DRAWINGS

Other characteristics and advantages will become apparent upon reading the following description, which is given for non-limiting and illustrative purposes, and from the appended drawings, in which.

DETAILED DESCRIPTION OF ILLUSTRATIVE EMBODIMENTS

In all of the figures of the present document, identical elements and steps are designated by the same numerical reference sign.

A first embodiment of a encoding or decoding method is described below, wherein the image is cut up into vertical bands and processing is carried out line-by-line. A person skilled in the art will be capable of easily transposing this teaching in order to implement a second embodiment wherein the image is cut up into horizontal bands and processing is carried out column-by-column.

The purpose of the proposed technique is to distribute the processing among N processors and M coprocessors distributed over S levels. More precisely, let: N>0, M>0, N+M>2 and S>0. Among all of the cases covered by this set of constraints, and by way of the example described hereinbelow (in relation with FIGS. 3 to 5, in particular), consideration will be given to a subset of these cases, which is defined by a set of more restrictive constraints, namely: N>1, S>0 and M>S (which therefore likewise implies that M>1). This subset includes the cases wherein there are several coprocessors and, for at least one level of coprocessors, several coprocessors.

In one particular embodiment, the apparatus and method of the disclosure are applied to H.264/AVC encoding. A set of four processors (N=4) and three coprocessors (M=3) in two layers (S=2) is used. A layer of two coprocessors makes it possible to carry out motion estimation. A layer comprising a single coprocessor makes it possible to estimate the best intra prediction modes. The four processors are responsible for the remainder of the processing.

Figures 1, 2:
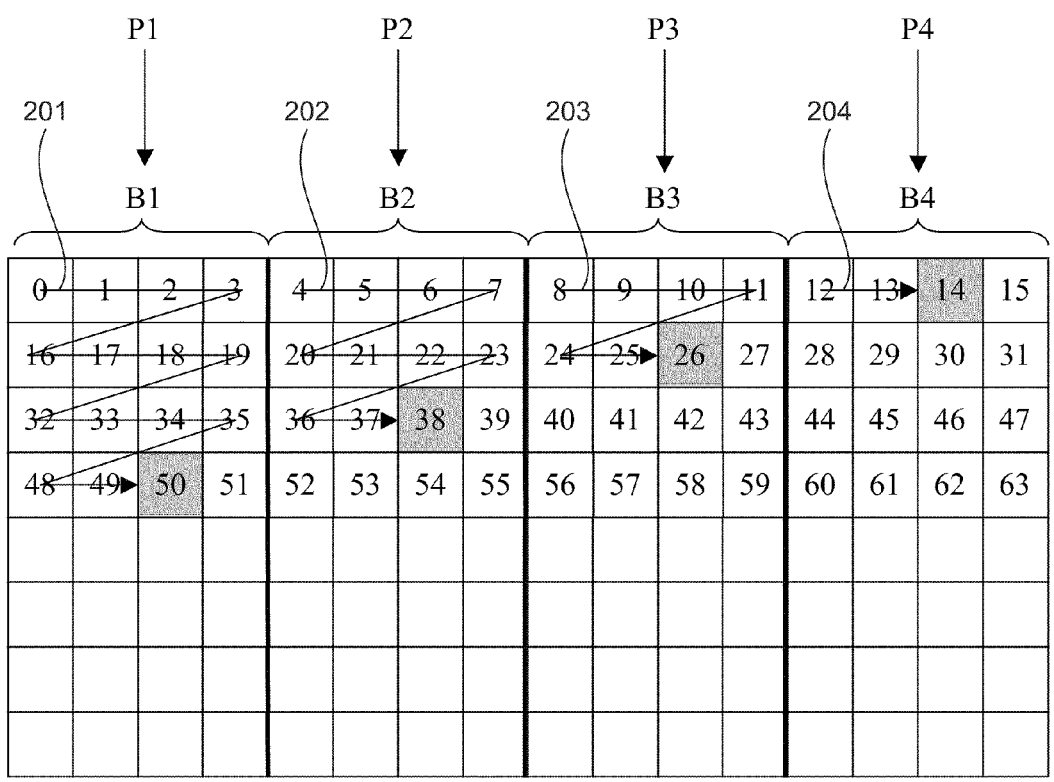
FIG. 1, which was already described in relation to the prior art, shows an example of spatial dependency with regard to processing an image block.
FIG. 2 shows the processing of an image according to the known technique described in patent application WO 2004/100557.

FIG. 2 shows the processing of an image according to the known technique described in patent application WO 2004/100557, There are N=4 processors. The image is cut up into N=4 vertical bands. Each processor $P_i$ is assigned to vertical band $B_i$, with $0 \leq i \leq 3$. The arrows referenced as 201, 202, 203 and 204 symbolize the line-by-line processing carried out by the processors. A time lag is applied between each vertical band, so as to ensure observance of the dependencies between blocks. In this way, in the example of FIG. 2, the shaded blocks (14, 26, 38 and 50) indicate the advancement of each processor to a moment t. For example, at this moment, block 36 can only have been processed if block 35 had already been processed by the processor $P_1$. According to patent application WO 2004/1000557, parallelization is possible on the condition of maintaining an adequate time-lag between the processors throughout the processing operation. The operation of the known technique is detailed hereinbelow.

Figure 3:
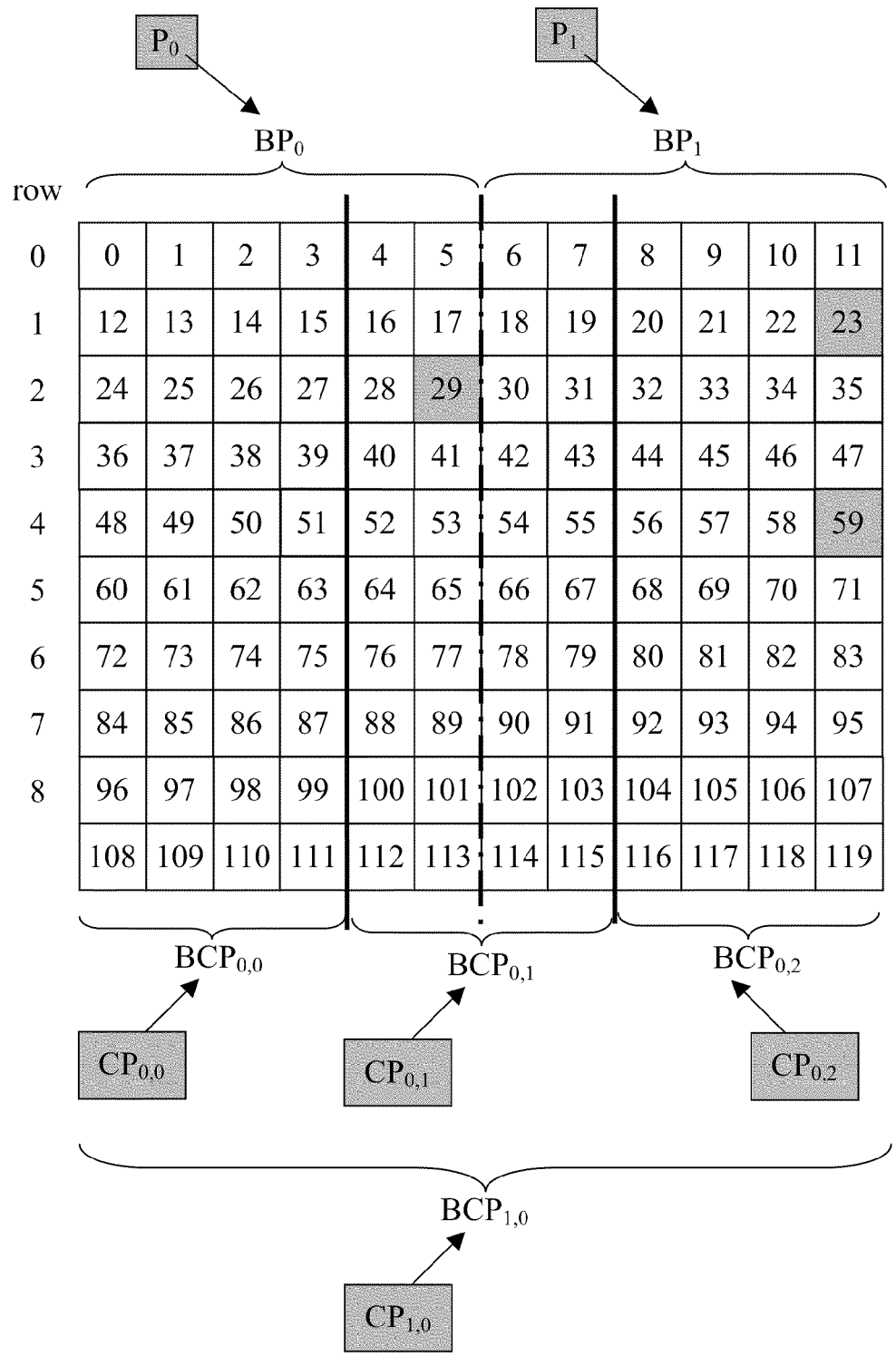
FIG. 3 shows the processing of an image according to one embodiment of the disclosure.

FIG. 3 shows the processing of an image according to an embodiment in which there are:
N=2 processors,
S=2 levels of coprocessors,
$M_0$=3 coprocessors on level s=0,
$M_s$=1 coprocessor on level s=1.

Just as in patent application WO 2004/100557, the image is cut up into bands of blocks perpendicular to the block processing direction. In this way, in all of our examples, the images are cut up into vertical bands.

The following notations are used, as shown in FIG. 3:
the image processed at a height of H blocks and a width of W blocks;
the N processors $P_i$ are assigned to N contiguous bands $BP_i$ having sizes of $K_i$ blocks, with $0 \leq i \leq N-1$;
let:

$$\sum_{i=0}^{N-1} K_i = W;$$

for any level of coprocessor s, with $0 \leq s \leq S-1$, the $M_s$ coprocessors $CP_{s,j}$ are assigned to $M_s$ contiguous bands $BCP_{s,j}$ having sizes of $Q_{s,j}$ blocks;
for any s, let $$\sum_{j=0}^{M_s-1} Q_{s,j} = W.$$

The line on which a processor or coprocessor is working is specified by the row r index. Line $BP_{i,r}$ corresponds to the line r of band $BCP_{s,j}$ which will be processed by the coprocessor of level s $CP_{s,j}$. Thus, for example, still in the case of FIG. 3:

line $BP_{0,2}$ contains blocks 24 to 29;
line $BCP_{0,1,1}$ contains blocks 16 to 19;
line $BCP_{1,0,3}$ contains blocks 36 to 47.

In this way, it is possible to summarize the operation of the technique of patent application WO 2004/100557 (shown in FIG. 2), based on these notations:
the processor $P_0$:
   processes the $K_0-1$ first blocks of line $BP_{0,r}$
   verifies that the first block of line $BP_{1,r-1}$ was processed by $P_1$ (if r>0);
   processes the last block of line $BP_{0,r}$
   provides the starting signal to the processor $P_1$ on line $BP_{1,r}$
   shifts to the next line $BP_{0,r+1}$
the processor $P_i$ (i>0; i<N-1):
   at the starting signal provided by $P_{i-1}$:
      processes the $K_i-1$ first blocks of line $BP_{i,r}$
      verifies that the first block of line $BP_{i+1,r-1}$ was processed by $P_{i+1}$ (if r>0)
      processes the last block of line $BP_{i,r}$
      provides the starting signal to the processor $P_{i+1}$ on line $BP_{i+1,r}$
      waits for the signal from $P_{i-1}$ in order to switch to the next line $BP_{i,r+1}$
the processor $P_i$ with i=N-1:
   at the starting signal provided by $P_{i-1}$:
      processes the $K_i$ blocks of line $BP_{i,r}$
      waits for the signal from $P_{i-1}$ in order to switch to the next line $BP_{i,r+1}$.

Taking the example of FIG. 3, and assuming N=2 processors, the operation of the known technique from patent application WO 2004/100557 is summarized in the following table:

| $P_0$ | $P_1$ |
|---|---|
| $BP_{0,0}$ | |
| Processing of blocks 0-5 | |
| Start of $BP_{1,0}$ on $P_1$ | |
| $BP_{0,1}$ | $BP_{1,0}$ |
| Processing of blocks 12-16 | Processing of blocks |
| Verification of block 6 on $P_1$ | 6-11 |
| Processing of block 17 | |
| Start of $BP_{1,1}$ on $P_1$ | |
| $BP_{0,2}$ | $BP_{1,1}$ |
| Processing of blocks 24-28 | Processing of blocks |
| Verification of block 18 on $P_1$ | 18-23 |
| Processing of block 29 | |
| Start of $BP_{1,2}$ on $P_1$ | |
| ... | ... |

The proposed technique is based on the management of message sending to the processors and coprocessors, according to the following rules:

Rule 1: Start message sent by a processor to a processor or by a coprocessor of a layer s to a coprocessor of the same layer.

When a processor $P_i$, with $i \geq 0$ and i<N-1, has finished processing a line $BP_{i,r}$, it sends a first start message on line $BP_{i+1,r}$ to the processor $P_{i+1}$. This first start message is known from patent application WO 2004/100557.

When a coprocessor $CP_{s,j}$ ($j \geq 0$; j<$M_s$-1) has finished processing a line $BCP_{s,j,r}$, it sends a second start message on line $BCP_{s,j+1,r}$ to the coprocessor $CP_{s,j+1}$. This second start message is not known from patent application WO 2004/100557.

Rule 2: Verification message sent by a processor to a processor or by a coprocessor of a layer s to a coprocessor of the same layer.

When a processor $P_i$ (i≧0; i<N−1) must process the last block of the line $BP_{i,r}$ (r>0), it sends a first verification message to the processor $P_{i+1}$ so as to verify if the first block of line $BP_{i+1, r−1}$ has already been processed. The first verification message is known from patent application WO 2004/100557.

When a coprocessor $CP_{s,j}$ (j≧0; j<$M_s$−1) must process the last block of the line $BCP_{s,j,r}$ (r>0), it sends a second verification message to the coprocessor $CP_{s,j+1}$ so as to verify if the first block of line $BCP_{s, j+1, r−1}$ has already been processed. This second verification message is not known from patent application WO 2004/100557.

Rule 3: Start message sent by a coprocessor to a processor.

When the first block of line $BCP_{s,j,r}$ belongs to line $BP_{i,r}$ and the last block of line $BCP_{s,j,r}$ belongs to line $BP_{i+k, r}$:
  if k is greater than 0, or
  if k is equal to 0 and the last block of line $BCP_{s,j,r}$ is the last block of line $BP_{i,r}$,
then, when the coprocessor $CP_{s,j}$ has finished processing line $BCP_{s,j,r}$, it sends a start message authorizing the processor $P_i$ to process line $BP_{i,r}$.

This third start message is not known from patent application WO 2004/100557.

Rule 4: Start messages awaited by a processor.

When it has finished line $BP_{i,r}$, un processor $P_i$ (i>0; i<N) waits for a message from $P_{i−1}$ before starting line $BP_{i, r+1}$.

For any s:
  if a line $BCP_{s,j,r}$ exists the first block of which is in line $BP_{i,r}$, then k is greater than or equal to 0 such that:
    line $BCP_{s,j+k,r}$ $BP_{i,r}$ has at least one block in line $BP_{i,r}$
    the last block of line $BCP_{s,j+k,r}$ is the last block of line $BP_{i,r}$ or belongs to another line $BP_{i+v, r}$ (v>0)
  the processor $P_i$ must receive a message from the coprocessor $CP_{s,j+k}$ before starting to process line $BP_{i,r}$.

Rule 5: Start messages awaited by a coprocessor.

When it has finished line $BCP_{s,j,r}$, a coprocessor $CP_{s,j}$ (j>0; j<$M_s$) waits for a message from $CP_{s,j−1}$ before starting $BCP_{s,j,r+1}$.

By applying these rules to all of the processors and coprocessors used, the list of communications (start messages and verification messages, in particular) required for proper working of an illustrative, non-limiting example of the disclosure is established.

Figure 4:
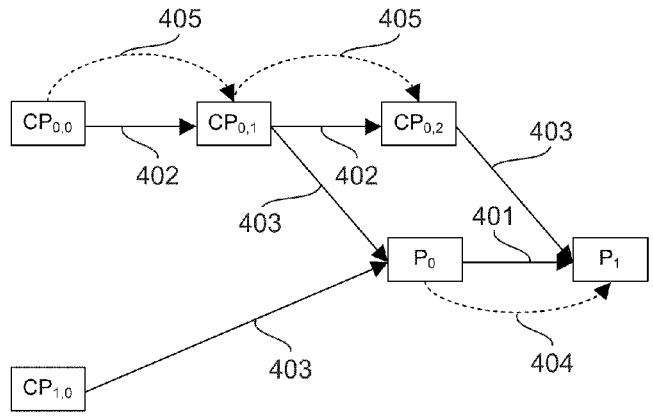
FIG. 4 summarizes the required communications (start messages and verification messages) in the example of FIG. 3.

Thus, FIG. 4 summarizes the communications (start messages and verification messages) required in the example of FIG. 3 (N=2, S=2, $M_0$=3 and $M_1$=1).

The solid arrows correspond to the start messages (see FIG. 5 for more details): the arrow referenced as 401 represents the first start messages, the arrows referenced as 402 represent the second start messages and the arrows referenced as 403 represent the third start messages.

The dotted arrows correspond to the verification messages: the arrow referenced as 404 represents the first verification messages and the arrows referenced as 405 represent the second verification messages.

The operation of the proposed technique can be summarized in this way:
  the processor $P_0$:
    at the start signal given by the coprocessors (S start messages required):
      processes the $K_0$−1 first blocks of line $BP_{0,r}$
      verifies that the first block of line $BP_{1, r−1}$ has been processed by $P_1$ (if r>0)
      processes the last block of line $BP_{0, r}$
      gives the start signal to the processor $P_1$ on line $BP_{1, r}$
      waits for the start messages from the coprocessors before switching to the next line $BP_{0, r+1}$
  the processor $P_i$ (i>0; i<N−1):
    at the start signal given by $P_{i−1}$ and by coprocessors, if necessary (rule 4):
      processes the $K_i$−1 first blocks of line $BP_{i, r}$
      verifies that the first block of line $BP_{i+1, r−1}$ has been processed by $P_{i+1}$ (if r>0)
      processes the last block of line $BP_{i, r}$
      gives the start signal to the processor $P_{i+1}$ on line $BP_{i+1, r}$
      waits for the signal from $P_{i−1}$ and from the coprocessors (if necessary) in order to switch to the next line $BP_{i, r+1}$
  the processor $P_i$ with i=N−1:
    at the start signal given by $P_{i−1}$ and by coprocessors, if necessary (rule 4):
      processes the $K_i$ blocks of line $BP_{i, r}$
      waits for the signal from $P_{i−1}$ and from the coprocessors (if necessary) in order to switch to the next line $BP_{i, r+1}$
  for every layer of coprocessors s:
    the coprocessor $CP_{s, 0}$:
      processes the $Q_{s, 0}$−1 first blocks of line $BCP_{s, 0, r}$
      verifies that the first block of line $BCP_{s, 1, r−1}$ has been processed by $CP_{s, 1}$ (if r>0)
      processes the last block of line $BCP_{s, 0, r}$
      gives the start signal to the coprocessor $CP_{s, 1}$ on line $BCP_{s, 1, r}$
      gives the start signal to a processor, if necessary (rule 3)
      switches to the next line $BCP_{s, 0, r+1}$
    the coprocessor $CP_{s, j}$ (j>0; j<$M_s$−1):
      at the start signal given by $CP_{s, j−1}$:
        processes the $Q_{s, j−1}$ first blocks of line $BCP_{s, j, r}$
        verifies that the first block of line $BCP_{s, j+1, r−1}$ has been processed by $CP_{s, j+1}$ (if r>0)
        processes the last block of line $BCP_{s, j, r}$
        gives the start le signal to the coprocessor $CP_{s, j+1}$ on line $BCP_{s, j+1, r}$
        gives the start signal to a processor, if necessary (rule 3)
        waits for the signal from $CP_{s, j−1}$ in order to switch to the next line $BCP_{s, j, r+1}$
    the coprocessor $CP_{s, j}$ with j=$M_s$−1:
      at the start signal given by $CP_{s, j−1}$:
        processes the $Q_{s, j}$ blocks of line $BCP_{s, j, r}$
        gives the start signal to a processor (rule 3)
        waits for the signal from $CP_{s, j−1}$ in order to switch to the next line $BCP_{s, j, r+1}$ Taking the example of FIG. 3, and assuming that N=2, S=2, $M_0$=3 and $M_1$=1, the operation of the proposed technique is summarized in the following table:

| $P_0$ | $P_1$ | $CP_{0,0}$ | $CP_{0,1}$ | $CP_{0,2}$ | $CP_{1,0}$ |
|---|---|---|---|---|---|
| | | $BCP_{0,0,0}$ Processing blocks 0-3 Start $BCP_{0,1,0}$ On $CP_{0,1}$ | | | $BCP_{1,0,0}$ Processing blocks 0-11 Start $BP_{0,0}$ on $P_0$ |
| | | $BCP_{0,0,1}$ Processing | $BCP_{0,1,0}$ Processing | | $BCP_{1,0,1}$ Processing |

-continued

| $P_0$ | $P_1$ | $CP_{0,0}$ | $CP_{0,1}$ | $CP_{0,2}$ | $CP_{1,0}$ |
|---|---|---|---|---|---|
| | | blocks 12-14 Verification block on on $CP_{0,1}$ Processing block 15 Start $BCP_{0,1,1}$ on $CP_{0,1}$ | blocks 4-7 Start $BCP_{0,2,0}$ on $CP_{0,2}$ Start $BP_{0,0}$ on $P_0$ | | blocks 12-23 Start $BP_{0,1}$ on $P_0$ |
| $BP_{0,0}$ Processing blocks 0-5 Start $BP_{1,0}$ on $P_1$ | | $BCP_{0,0,2}$ Processing blocks 24-26 Verification block 16 on $CP_{0,1}$ Processing bloc 27 Start $BCP_{0,1,2}$ on $CP_{0,1}$ | $BCP_{0,1,1}$ Processing blocks 16-18 Verification block 8 on $CP_{0,2}$ Processing block 19 Start $BCP_{0,2,1}$ on $CP_{0,2}$ Start $BP_{0,1}$ on $P_0$ | $BCP_{0,2,0}$ Processing blocks 8-11 Start $BP_{1,0}$ on $P_1$ | $BCP_{1,0,2}$ Processing blocks 24-35 Start $BP_{0,2}$ on $P_0$ |
| $BP_{0,1}$ Processing blocks 12-16 Verification block 6 on $P_1$ Processing block 17 Start $BP_{1,1}$ on $P_1$ | $BP_{1,0}$ Processing blocks 6-11 | $BCP_{0,0,3}$ Processing blocks 36-38 Verification block 28 on $CP_{0,1}$ Processing block 39 Start $BCP_{0,1,3}$ on $CP_{0,1}$ | $BCP_{0,1,2}$ Processing blocks 28-30 Verification block 20 on $CP_{0,2}$ Processing block 31 Start $BCP_{0,2,2}$ on $CP_{0,2}$ Start $BP_{0,2}$ on $P_0$ | $BCP_{0,2,1}$ Processing blocks 20-23 Start $BP_{1,1}$ on $P_1$ | $BCP_{1,0,3}$ Processing blocks 36-47 Start $BP_{0,3}$ on $P_0$ |
| $BP_{0,2}$ Processing blocks 24-28 Verification block 18 on $P_1$ Processing block 29 Start $BP_{1,2}$ on $P_1$ | $BP_{1,1}$ Processing blocks 18-23 | $BCP_{0,0,4}$ Processing blocks 48-50 Verification block 40 on $CP_{0,1}$ Processing block 51 Start $BCP_{0,1,4}$ on $CP_{0,1}$ | $BCP_{0,1,3}$ Processing blocks 40-42 Verification block 32 on $CP_{0,2}$ Processing block 43 Start $BCP_{0,2,3}$ on $CP_{0,2}$ Start $BP_{0,3}$ on $P_0$ | $BCP_{0,2,2}$ Processing blocks 32-35 Start $BP_{1,2}$ on $P_1$ | $BCP_{1,0,4}$ Processing blocks 48-59 Start $BP_{0,4}$ on $P_0$ |
| ... | ... | ... | ... | ... | ... |

Figure 5:
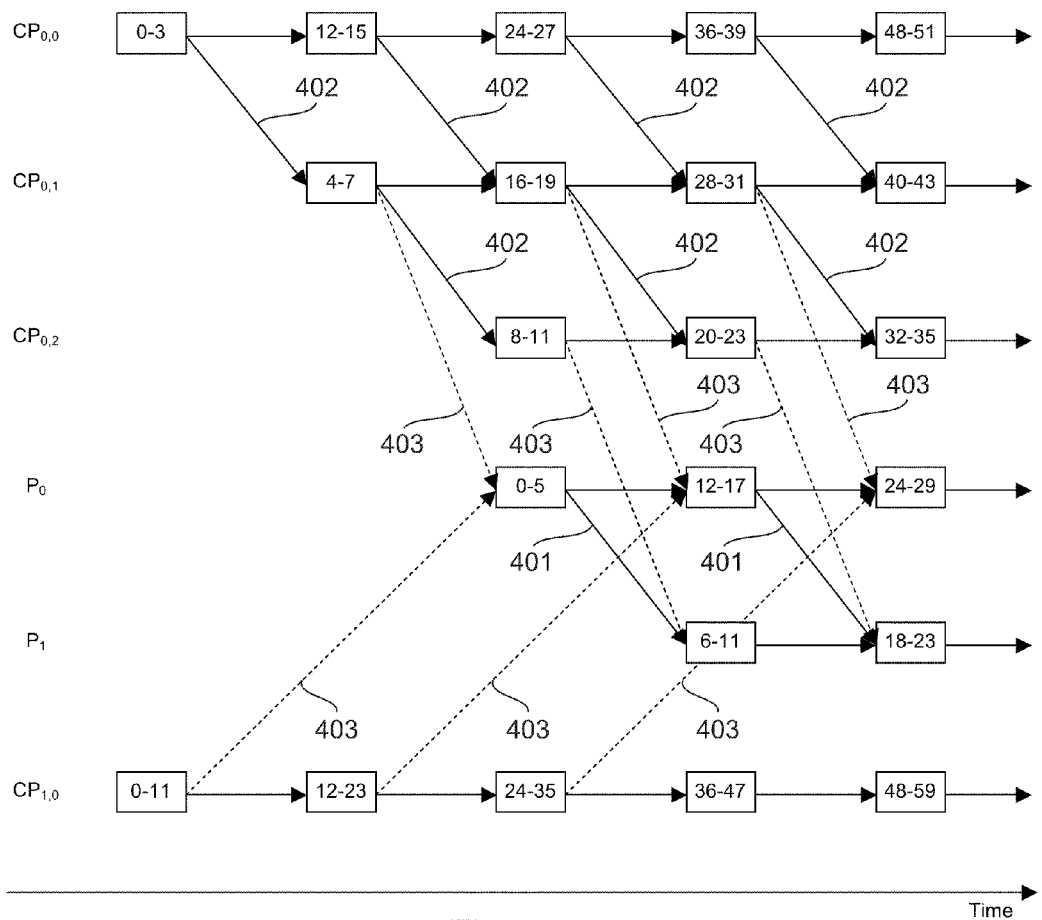
FIG. 5 details the start messages exchanged in the example of FIG. 3.

FIG. 5 details the start messages from this table (i.e., the first 401, second 402 and third 403 start messages already mentioned in the description of FIG. 4), which are exchanged in the example of FIG. 3.

Figure 6:
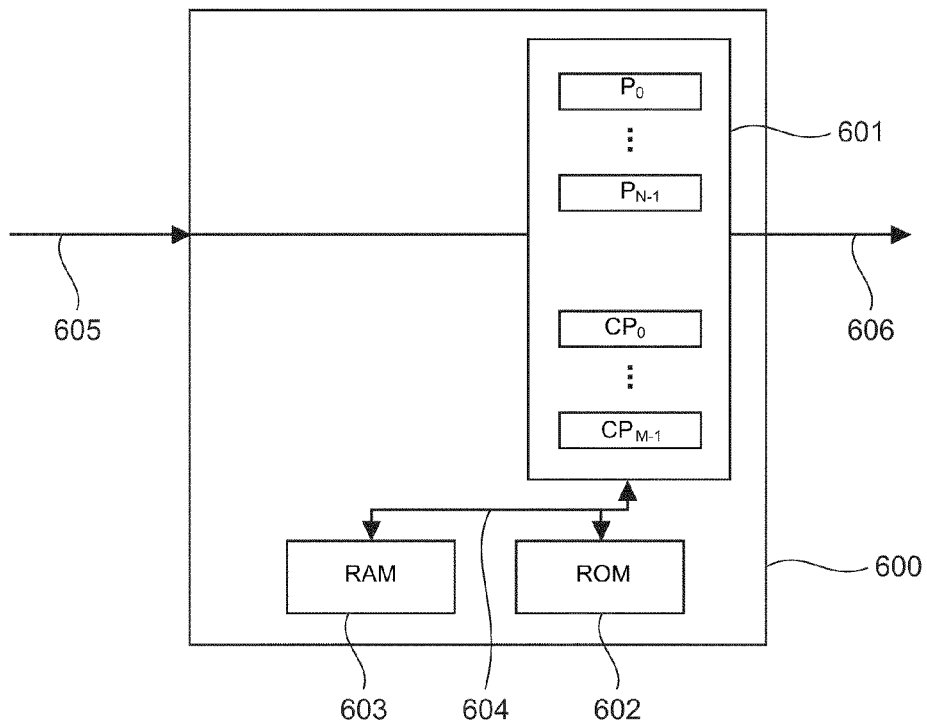
FIG. 6 shows the structure of an encoder according to a first embodiment of the disclosure.

FIG. 6 shows the simplified structure of a encoding/decoding device 600 according to a first embodiment. This device includes a communication bus 604 connected to:

A read-only memory (ROM) 602;

a random access memory (RAM) 603; and a set 601 of N processors (referenced as $P_0$ to $P_{N-1}$) and M coprocessors (referenced as CP0 to $CP_{M-1}$), which are distributed over S levels (with N>0, M>0, N+M>2 and S>0, and even N>1, S>0 and M>S).

The read-only memory 602 stores the executable code of the programs, which, when the programs are executed by the processors and coprocessors, enable implementation of the technique of the disclosure, e.g., according to the embodiment the rules and operation of which are described above in connection with FIGS. 3 to 5.

Upon initialization, the aforementioned program code instructions are transferred to the random access memory 603 so as to be executed by the processors and coprocessors of the set referenced as 601. The random access memory 603 likewise includes registers for storing the variables and parameters required for this execution. The set 601 of processors and coprocessors receives an incoming video sequence to be encoded 605 and the code in the form of a encoded sequence 606, according to the instructions of the aforementioned programs. The device 600 delivers an outgoing encoded sequence.

In this first embodiment, the start messages and the verification messages are generated by the processors and coprocessors, which send them to one another directly.

Figure 7:
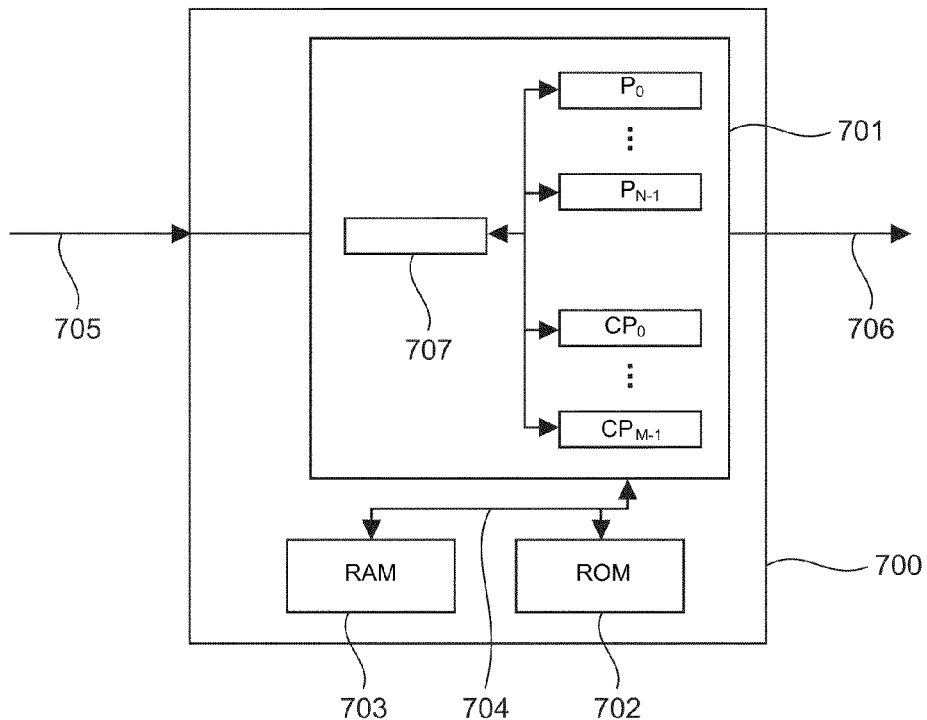
FIG. 7 shows the structure of an encoder according to a second embodiment of the disclosure.

FIG. 7 shows the simplified structure of a encoding/decoding device 700 according to a second embodiment. This device includes a communication bus 704 connected to:

a read-only memory (ROM) 702;

a random access memory (RAM) 703;

a set 701 of N processors (referenced as $P_0$ to $P_{N-1}$) and M coprocessors (referenced as $CP_0$ to $CP_{M-1}$), which are distributed over S levels (with N>0, M>0, N+M>2 and S>0, and even N>1, S>0 and M>S); and a supervisory processor 707, which supervises the operation of the set 701 of processors and coprocessors, and, in particular, generates and sends the start messages and verification messages, based on the information provided by the processors and coprocessors of set 701.

The read-only memory 702 stores the executable code of the programs, which, when the programs are executed by the supervisory processor 707 and the set 701 of processors and coprocessors, enable implementation of the technique of the disclosure, e.g., according to an alternative embodiment the rules and operation of which are described above in connection with FIGS. 3 to 5. The operation of this alternative is detailed below.

Upon initialization, the aforementioned program code instructions are transferred to the random access memory 703 so as to be executed by the supervisory processor 707 and the set 701 of processors and coprocessors. The random access memory 703 likewise includes registers for storing the variables and parameters required for this execution. The supervisory processor 707 and the set 701 of processors and coprocessors receive an incoming video sequence to be encoded 705 and encode same in the form of an encoded sequence 706, according to the instructions of the aforementioned programs. The device 700 delivers an outgoing encoded sequence 706.

In this second embodiment, the start messages and the verification messages are generated and sent by the supervisory processor 707, from information provided by the processors and coprocessors of the set referenced as 701.

The operation of the alternative proposed in this second embodiment can be summarized in this way:

the processor $P_0$:
  at the start signal given by the supervisory processor 707 (S start messages required, one per coprocessor):
    processes the $K_0-1$ first blocks of line $BP_{0,r}$
    informs the supervisory processor 707 of this in order for the latter to verify that the first block of line $BP_{1,r-1}$ has been processed by $P_1$ (if r>0)
    processes the last block of line $BP_{0,r}$ informs the supervisory processor 707 of this in order for the latter to give the start signal to the processor $P_1$ on line $BP_{1,r}$ waits for the start messages from the supervisory processor 707 before switching to the next line $BP_{0,r+1}$ the processor $P_i$ (i>0; i<N−1):

at the start signal (start message(s)) given by the supervisory processor 707 from information provided by $P_{i-1}$ and by coprocessors, if necessary (equivalent to rule 4):

processes the $K_i-1$ first blocks of line $BP_{i,r}$ informs the supervisory processor 707 of this in order for the latter to verify that the first block of line $BP_{i+1,r-1}$ has been processed by $P_{i+1}$ (if r>0)

processes the last block of line $BP_{i,r}$ informs the supervisory processor 707 of this in order for the latter to give the start signal to the processor $P_{i+1}$ on line $BP_{i+1,r}$ waits for the start message(s) sent by the supervisory processor 707 based on information provided by $P_{i-1}$ and by coprocessors, if necessary, in order to switch to the next line $BP_{i,r+1}$ the processor $P_i$ with i=N−1:

at the start signal (start message(s)) given by the supervisory processor 707 based on information provided by $P_{i-1}$ and by coprocessors, if necessary (equivalent to rule 4):

processes the $K_i$ blocks of line $BP_{i,r}$ waits for the start message(s) sent by the supervisory processor 707 based on information provided by $P_{i-1}$ and by coprocessors, if necessary, in order to switch to the next line $BP_{i,r+1}$ for any coprocessor layer s:

the coprocessor $CP_{s,0}$:

processes the $Q_{s,0}-1$ first blocks of line $BCP_{s,0,r}$ informs the supervisory processor 707 of this, in order for the latter to verify that the first block of line $BCP_{s,1,r-1}$ has been processed by $CP_{s,1}$ (if r>0)

processes the last block of line $BCP_{s,0,r}$ informs the supervisory processor 707 of this, in order for the latter to give the start signal to the coprocessor $CP_{s,1}$ on line $BCP_{s,1,r}$, and to give the start signal to a processor, if necessary (equivalent to rule 3);

switches to the next line $BCP_{s,0,r+1}$ the coprocessor $CP_{s,j}$ (j>0; j<$M_s$−1):

at the start signal given by the supervisory processor 707 based information provided by the coprocessor $CP_{s,j-1}$:

processes the $Q_{s,j-1}$ first blocks of line $BCP_{s,j,r}$ informs the supervisory processor 707 of this, in order for the latter to verify that the first block of line $BCP_{s,j+1,r-1}$ has been processed by $CP_{s,j+1}$ (if r>0)

processes the first block of line $BCP_{s,j,r}$ informs the supervisory processor 707 of this, in order for the latter to give the start signal to the coprocessor $CP_{s,j+1}$ on line $BCP_{s,j+1,r}$, and to give the start signal to a processor, if necessary, (equivalent to rule 3)

waits for the start signal given by the supervisory processor 707 based on information provided by the coprocessor $CP_{s,j-1}$, in order to switch to the next line $BCP_{s,j,r+1}$ the coprocessor $CP_{s,j}$ with j=$M_s$−1:

at the start signal given by the supervisory processor 707 based on information provided by the coprocessor $CP_{s,j-1}$:

processes the $Q_{s,j}$ blocks of line $BCP_{s,j,r}$ informs the supervisory processor 707 of this, in order for the latter to give the start signal to a processor (equivalent to rule 3)

waits for the start signal given by the supervisory processor 707 based on information provided by the coprocessor $CP_{s,j-1}$, in order to switch to the next line $BCP_{s,j,r+1}$.

It is clear that numerous other embodiments of the encoding/decoding device can be anticipated, without departing from the scope of the present disclosure and/or the subject matter of the appended claims.

It should be noted that the disclosure and/or claims is not limited to a purely software-based implementation, in the form of computer program instructions, but that it can also be implemented in hardware form or any form combining a hardware portion and a software portion.

At least one embodiment of the disclosure mitigates various disadvantages of the prior art.

More precisely, at least one embodiment provides a technique which, in order to increase the total computing power, enables processing to be parallelized and synchronized between a set of processors and one or more sets of coprocessors of different cardinalities, while at the same time respecting the spatial dependencies which exist between the blocks of an image (causality constraints, as shown, for example, in FIG. 1).

At least one embodiment likewise provides such a technique which is simple to implement and inexpensive.

At least one embodiment provides such a technique that is suitable for any situation wherein the number N of processors is different from the number M of coprocessors (N≠M, with N>0 and M>0).

At least one embodiment provides such a technique making it possible to optimize the computing time and the synchronization messages exchanged between the processors and coprocessors.

The invention claimed is:

1. A method for encoding or decoding an image comprising rectangular blocks of pixels, the image having a height of H blocks and a width of W blocks, the image being cut up into vertical bands of blocks having said height of H blocks, wherein said method comprises the following steps:

obtaining N processors and M coprocessors, said M coprocessors being distributed over S levels, with N>1, S>0 and M>S;

assigning said N processors $P_i$ to N contiguous bands $BP_i$ having sizes of $K_i$ blocks, with $0 \leq i \leq N-1$ and $$\sum_{i=0}^{N-1} K_i = W;$$

for every level of coprocessors s, with $0 \leq s \leq S-1$, assigning $M_s$ coprocessors $CP_{s,j}$ to $M_s$ contiguous bands $BCP_s$, having sizes of $Q_{s,j}$ blocks, with:

$$\sum_{j=0}^{M_s-1} Q_{s,j} = W;$$

managing message sending to the processors and coprocessors according to the following rules, $BP_{i,r}$ being a line of row r of band $BP_i$, and $BCP_{s,j,r}$ being a line of row r of band $BCP_{s,j}$, with $0 \leq r \leq H-1$:
- when a processor $P_i$, with $i \geq 0$ and $i<N-1$, has finished processing a line $BP_{i,r}$, sending a first start message authorizing the processor $P_{i+i}$ to process line $BP_{i+i, r}$;
- when a coprocessor $CP_{s,j}$, with $j \geq 0$ and $j<M_s-1$, has finished processing a line $BCP_{s,j,r}$, sending a second start message authorizing the coprocessor $CP_{s,j+1}$ to process line $BCP_{s,j+1, r}$;
- when a processor $P_i$, with $i \geq 0$ and $i<N-1$, must process the last block of line $BP_{i, r}$, with $r>0$, sending a first verification message to the processor $P_{i+1}$ so as to verify if the first block of line $BP_{i+1, r-1}$ has already been processed;
- when a coprocessor $CP_{s,j}$, with $j \geq 0$ and $j<M_s-1$, must process the last block of line $BCP_{s, j, r}$ with $r>0$, sending a second verification message to the coprocessor $CP_{s, j+1}$ so as to verify if the first block of line $BCP_{s, j+1, r-1}$ has already been processed;
- when the first block of line $BCP_{s, j, r}$ belongs to line $BP_{i, r}$ and the last block of line $BCP_{s,j, r}$ belongs to line $BP_{i+k, r}$:
  if k is greater than 0, or
  if k is equal to 0 and the last block of line $BCP_{s, j, r}$ is the last block of line $BP_{i, r}$,
  then when the coprocessor $CP_{s,j}$ has finished processing line $BCP_{s, j, r}$ sending a third start message authorizing the $P_i$ to process line $BP_{i, r}$.

2. A method for encoding or decoding an image comprising rectangular blocks of pixels, the image having a height of H blocks and a width of W blocks, the image being cut up into horizontal bands of blocks having said width of W blocks, wherein said method comprises the following steps:
  obtaining N processors and M coprocessors, said M coprocessors being distributed over S levels, with $N>1$, $S>0$ and $M>S$;
  assigning said N processors $P_i$ to N contiguous bands $BP_i$ having sizes of $K_i$ blocks, with $0 \leq i - N-1$ and $$\sum_{j=0}^{M_s-1} Q_{s,j} = H;$$

for every level of coprocessors s, with $0 \leq s \leq S-1$, assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = H;$$

managing message sending to the processors and coprocessors according to the following rules, $BP_{i,r}$ being a column of row r of band $BP_i$, and $BCP_{s, j, r}$ being a column of row r of band $BCP_{s,j}$, with $0 \leq r \leq W-1$:
    when a processor $P_i$, with $i \geq 0$ and $i<N-1$, has finished processing a column $BP_{i,r}$, sending a first start message authorizing the processor $P_{i+1}$ to process column $BP_{i+i, r}$;
    when a coprocessor $CP_{s,j}$, with $j \geq 0$ and $j<M_s-1$, has finished processing a column $BCP_{s, j, r}$, sending a second start message authorizing the $CP_{s, j+1}$ to process column $BCP_{s, j+1, r}$;
    when a processor $P_i$, with $i \geq 0$ and $i<N-1$, must process the last block of column $BP_{i, r}$, with $r>0$, sending a first verification message to the processor $P_{i+1}$ so as to verify if the first block of column $BP_{i+1, r-1}$ has already been processed;
    when a coprocessor $CP_{s, j}$, with $j \geq 0$ and $j<M_s-1$, must process the last block of column $BCP_{s, j, r}$, with $r>0$, sending a second verification message to the coprocessor $CP_{s, j+1}$ so as to verify if the first block of column $BCP_{s, j+1, r-1}$ has already been processed;
    when the first block of column $BCP_{s, j, r}$ belongs to column $BP_{i, r}$ and the last block of column $BCP_{s, j, r}$ belongs to column $BP_{i+k, r}$:
    if k is greater than 0, or
    if k is equal to 0 and the last block of column $BCP_{s,j, r}$ is the last block of column $BP_{i, r}$,
    then when the coprocessor $CP_{s,j}$ has finished processing column $BCP_{s,j, r}$, sending a third start message authorizing the $P_i$ to process column $BP_{i, r}$.

3. A method as claimed in claim 1, wherein the encoding and decoding is compliant with a standard belonging to the group comprising: H.263, H.263+, H264 and MPEG-4 Video.

4. A non-transitory computer-readable storage medium storing a computer program comprising a set of instructions executable by a computer in order to implement a method for encoding or decoding an image comprising rectangular blocks of pixels, the image having a height of H blocks and a width of W blocks, the image being cut up into vertical bands of blocks having said height of H blocks, wherein said method comprises the following steps:
  obtaining N processors and M coprocessors, said M coprocessors being distributed over S levels, with $N>1$, $S>0$ and $M>S$;
  assigning said N processors $P_i$ to N contiguous bands $BP_i$ having sizes of $K_i$ blocks, with $0 \leq i \leq N-1$ and $$\sum_{i=0}^{N-1} K_i = W;$$

for every level of coprocessors s, with $0 \leq s \leq S-1$, assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = W;$$

managing message sending to the processors and coprocessors according to the following rules, $BP_{i,r}$ being a line of row r of band $BP_i$, and $BCP_{s, j, r}$ being a line of row r of band $BCP_{s, j}$, with $0 \leq r \leq H-1$:
    when a processor $P_i$, with $i \geq 0$ and $i<N-1$, has finished processing a line $BP_{i,r}$, sending a first start message authorizing the processor $P_{i+1}$ to process line $BP_{i+1, r}$;
    when a coprocessor $CP_{s,j}$, with $j \geq 0$ and $j<M_s-1$, has finished processing a line $BCP_{s, j, r}$, sending a second start message authorizing the coprocessor $CP_{s, j+1}$ to process line $BCP_{s, j+1, r}$;
    when a processor $P_i$, with $i \geq 0$ and $i<N-1$, must process the last block of line $BP_{i, r}$, with $r>0$, sending a first verification message to the processor $P_{i+1}$ so as to verify if the first block of line $BP_{i+1, r-1}$ has already been processed;

when a coprocessor $CP_{s,j}$, with $j \geq 0$ and $j<M_s-1$, must process the last block of line $BCP_{s,j,r}$, with $r>0$, sending a second verification message to the coprocessor $CP_{s,j+1}$ so as to verify if the first block of line $BCP_{s,j+1,r-1}$ has already been processed;

when the first block of line $BCP_{s,j,r}$ belongs to line $BP_{i,r}$ and the last block of line $BCP_{s,j,r}$ belongs to line $BP_{i+k,r}$:
- if k is greater than 0, or
- if k is equal to 0 and the last block of line $BCP_{s,j,r}$ is the last block of line $BP_{i,r}$, then when the coprocessor $CP_{s,j}$ has finished processing line $BCP_{s,j,r}$, sending a third start message authorizing the $P_i$ to process line $BP_{i,r}$.

5. A non-transitory computer-readable storage medium storing a computer program comprising a set of instructions executable by a computer in order to implement a method for encoding or decoding an image comprising rectangular blocks of pixels, the image having a height of H blocks and a width of W blocks, the image being cut up into horizontal bands of blocks having said width of W blocks, wherein said method comprises the following steps:

obtaining N processors and M coprocessors, said M coprocessors being distributed over S levels, with $N>1$, $S>0$ and $M>S$;

assigning said N processors $P_i$ to N contiguous bands $BP_i$ having sizes of $K_i$ blocks, with $01 \leq i \leq N-1$ and $$\sum_{j=0}^{M_s-1} Q_{s,j} = H;$$

for every level of coprocessors s, with $0 \leq s \leq S-1$, assigning $M_s$ coprocessors $CP_{s,j}$ to $M_s$ contiguous bands $BCP_s$, having sizes of $Q_{s,j}$ blocks, with:

$$\sum_{j=0}^{M_s-1} Q_{s,j} = H;$$

managing message sending to the processors and coprocessors according to the following rules, $BP_{i,r}$ being a column of row r of band $BP_i$, and $BCP_{s,j,r}$ being a column of row r of band $BCP_{s,j}$, with $0 \leq r \leq W-1$:

when a processor $P_i$, with $i \geq 0$ and $i<N-1$, has finished processing a column $BP_{i,r}$, sending a first start message authorizing the processor $P_{i+1}$ to process column $BP_{i+1,r}$;

when a coprocessor $CP_{s,j}$, with $j \geq 0$ and $j<M_s-1$, has finished processing a column $BCP_{s,j,r}$, sending a second start message authorizing the $CP_{s,j+1}$ to process column $BCP_{s,j+1,r}$;

when a processor $P_i$, with $i \geq 0$ and $i<N-1$, must process the last block of column $BP_{i,r}$, with $r>0$, sending a first verification message to the processor $P_{i+1}$ so as to verify if the first block of column $BP_{i+1,r-1}$ has already been processed;

when a coprocessor $CP_{s,j}$, with $j \geq 0$ and $j<M_s-1$, must process the last block of column $BCP_{s,j,r}$, with $r>0$, sending a second verification message to the coprocessor $CP_{s,j+1}$ so as to verify if the first block of column $BCP_{s,j+1,r-1}$ has already been processed;

when the first block of column $BCP_{s,j,r}$ belongs to column $BP_{i,r}$ and the last block of column $BCP_{s,j,r}$ belongs to column $BP_{i+k,r}$:
- if k is greater than 0, or
- if k is equal to 0 and the last block of column $BCP_{s,j,r}$ is the last block of column $BP_{i,r}$, then when the coprocessor $CP_{s,j}$ has finished processing column $BCP_{s,j,r}$, sending a third start message authorizing the $P_i$ to process column $BP_{i,r}$.

6. An image encoding/decoding device, the image comprising rectangular blocks of pixels, the image having a height of H blocks and a width of W blocks, the image being cut up into vertical bands of blocks, wherein said device comprises:

N processors and M coprocessors, said M coprocessors being distributed over S levels, with $N>1$, $S>0$ and $M>S$;

means for assigning said N processors $P_i$ to N contiguous bands $BP_i$ having sizes of $K_i$ blocks, with $0 \leq i \leq N-1$ and $$\sum_{i=0}^{N-1} K_i = W;$$

for every level of coprocessors s, with $0 \leq s \leq S-1$, means for assigning $M_s$ coprocessors $CP_{s,j}$ to $M_s$ contiguous bands $BCP_{s,j}$ having sizes of $Q_{s,j}$ blocks, with:

$$\sum_{j=0}^{M_s-1} Q_{s,j} = W;$$

means for managing message sending to the processors and coprocessors according to the following rules, $BP_{i,r}$ being a line of row r of band $BP_i$, and $BCP_{s,j,r}$ being a line of row r of band $BCP_{s,j}$, with $0 \leq r \leq H-1$:

when a processor $P_i$, with $i \geq 0$ and $i<N-1$, has finished processing a line $BP_{i,r}$, sending a first start message authorizing the processor $P_{i+1}$ to process line $BP_{i+1,r}$;

when a coprocessor $CP_{s,j}$, with $j \geq 0$ and $j<M_s-1$, has finished processing a line $BCP_{s,j,r}$, sending a second start message authorizing the coprocessor $CP_{s,j+1}$ to process line $BCP_{s,j+1,r}$;

when a processor $P_i$, with $i \geq 0$ and $i<N-1$, must process the last block of line $BP_{i,r}$, with $r>0$, sending a first verification message to the processor $P_{i+1}$ so as to verify if the first block of line $BP_{i+1,r-1}$ has already been processed;

when a coprocessor $CP_{s,j}$, with $j \geq 0$ and $j<M_s-1$, must process the last block of line $BCP_{s,j,r}$, with $r>0$, sending a second verification message to the coprocessor $CP_{s,j+1}$ so as to verify if the first block of line $BCP_{s,j+1,r-1}$ has already been processed;

when the first block of line $BCP_{s,j,r}$ belongs to line $BP_{i,r}$ and the last block of line $BCP_{s,j,r}$ belongs to line $BP_{i+k,r}$:
- if k is greater than 0, or
- if k is equal to 0 and the last block of line $BCP_{s,j,r}$ is the last block of line $BP_{i,r}$, then when the coprocessor $CP_{s,j}$ has finished processing line $BCP_{s,j,r}$, sending a third start message authorizing the $P_i$ to process line $BP_{i,r}$.

7. An image encoding or decoding device, the image comprising rectangular blocks of pixels, the image having a height of H blocks and a width of W blocks, the image being cut up into horizontal bands of blocks having said width of W blocks, wherein said device comprises:

N processors and M coprocessors, said M coprocessors being distributed over S levels, with N>1, S>0 and M>S;

means for assigning said N processors $P_i$ to N contiguous bands $BP_i$ having sizes of $K_i$ blocks, with $0 \leq i \leq N-1$ and $$\sum_{j=0}^{M_S-1} Q_{s,j} = H;$$

for every level of coprocessors s, with $0 \leq s \leq S-1$, means for assigning $M_s$ coprocessors $CP_{s,j}$ to $M_s$ contiguous bands $BCP_{s,j}$ having sizes of $Q_{s,j}$ blocks, with:

$$\sum_{j=0}^{M_S-1} Q_{s,j} = H;$$

means for managing message sending to the processors and coprocessors according to the following rules, $BP_{i,r}$ being a column of row r of band $BP_i$, and $BCP_{s,j,r}$ being a column of row r of band $BCP_{s,j}$, with $0 \leq r \leq W-1$:

when a processor $P_i$, with $i \geq 0$ and $i<N-1$, has finished processing a column $BP_{i,r}$, sending a first start message authorizing the processor $P_{i+1}$ to process column $BP_{i+1,r}$;

when a coprocessor $CP_{s,j}$, with $j \geq 0$ and $j<M_s-1$, has finished processing a column $BCP_{s,j,r}$, sending a second start message authorizing the coprocessor $CP_{s,j+1}$ to process column $BCP_{s,j+1,r}$;

when a processor $P_i$, with $i \geq 0$ and $i<N-1$, must process the last block of column $BP_{i,r}$, with r>0, sending a first verification message to the processor $P_{i+1}$ so as to verify if the first block of column $BP_{i+1,r-1}$ has already been processed;

when a coprocessor $CP_{s,j}$, with $j \geq 0$ and $j<M_s-1$, must process the last block of column $BCP_{s,j,r}$, with r>0, sending a second verification message to the coprocessor $CP_{s,j+1}$ so as to verify if the first block of column $BCP_{s,j+1,r-1}$ has already been processed;

when the first block of column $BCP_{s,j,r}$ belongs to column $BP_{i,r}$ and the last block of column $BCP_{s,j,r}$ belongs to column $BP_{i+k,r}$:

if k is greater than 0, or if k is equal to 0 and the last block of column $BCP_{s,j,r}$ is the last block of column $BP_{i,r}$, then when the coprocessor $CP_{s,j}$ has finished processing column $BCP_{s,j,r}$, sending a third start message authorizing the $P_i$ to process column $BP_{i,r}$.

8. A device as claimed in claim 6, wherein the encoding or decoding is compliant with a standard belonging to the group comprising: H.263, H.263+, H264 and MPEG-4 Video.

9. A device as claimed in claim 7, wherein the encoding or decoding is compliant with a standard belonging to the group comprising: H.263, H.263+, H264 and MPEG-4 Video.

10. A method as claimed in claim 2, wherein the encoding and decoding is compliant with a standard belonging to the group comprising: H.263, H.263+, H264 and MPEG-4 Video.

* * * * *